Feb. 6, 1968    J. B. THOMPSON, JR    3,367,078
FASTENING DEVICE FOR EXPANDED-METAL SHEETS
Filed June 9, 1964    2 Sheets-Sheet 1
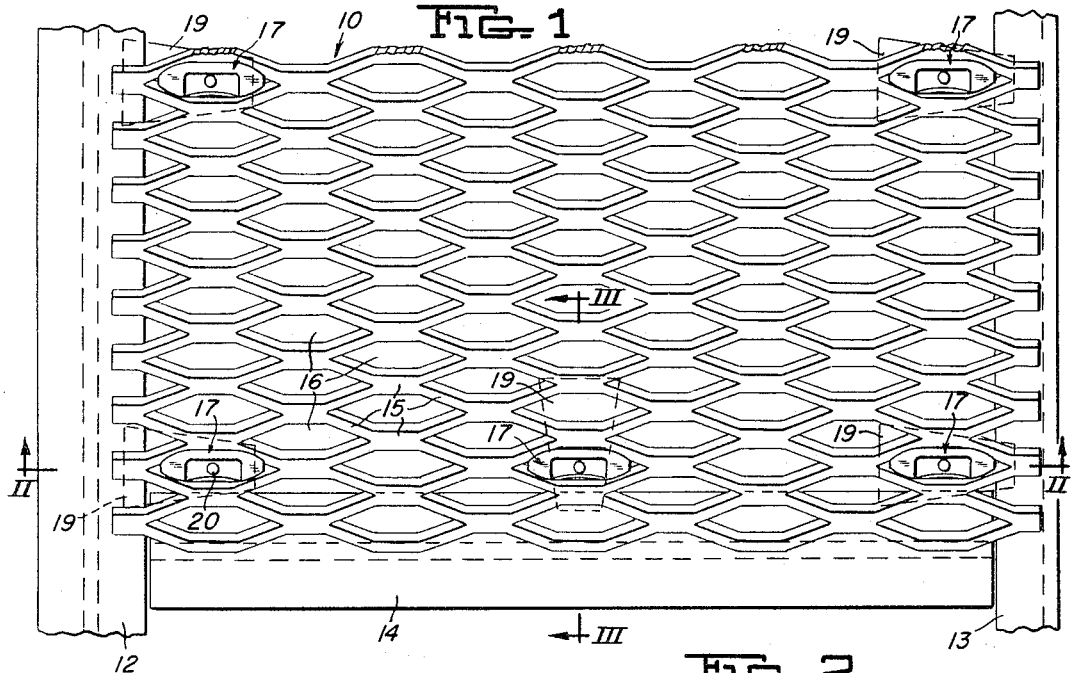
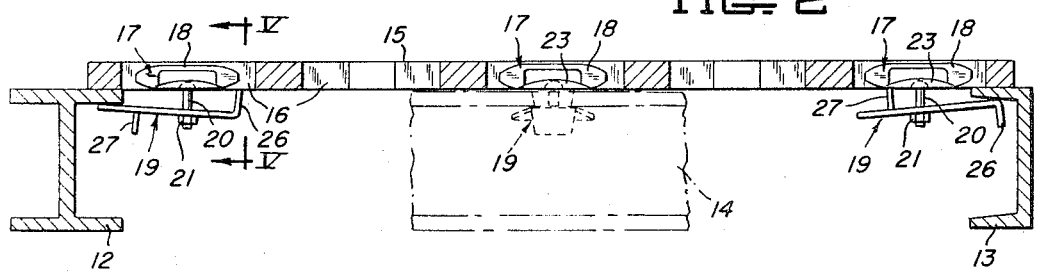
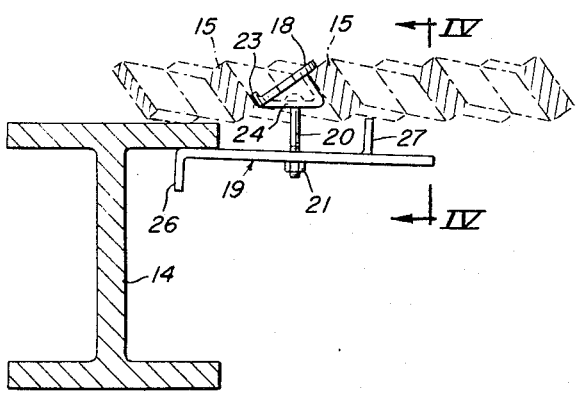
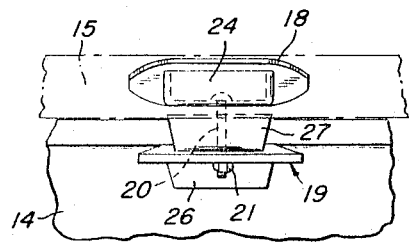
INVENTOR
JERRELL B. THOMPSON, Jr.
By Donald G. Dalton
Attorney Feb. 6, 1968   J. B. THOMPSON, JR   3,367,078
FASTENING DEVICE FOR EXPANDED-METAL SHEETS
Filed June 9, 1964   2 Sheets-Sheet 2
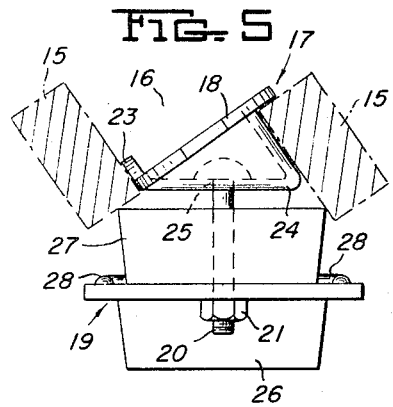
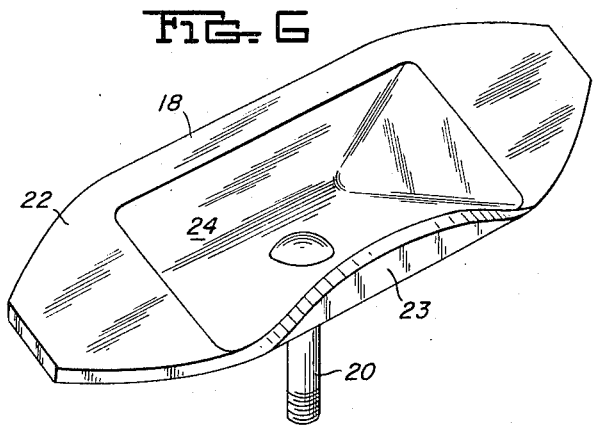
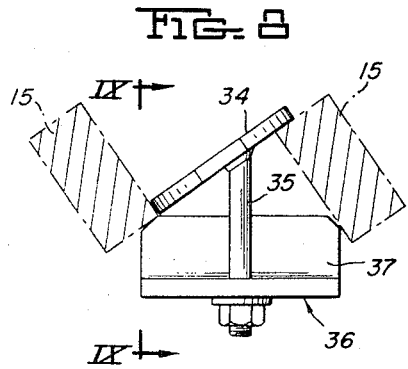
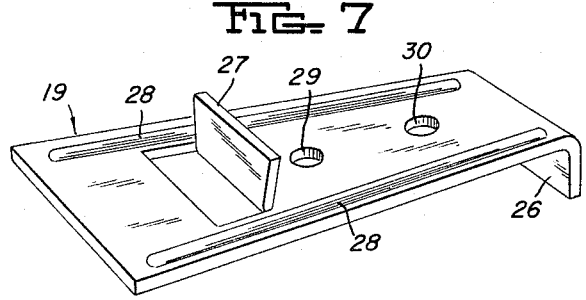
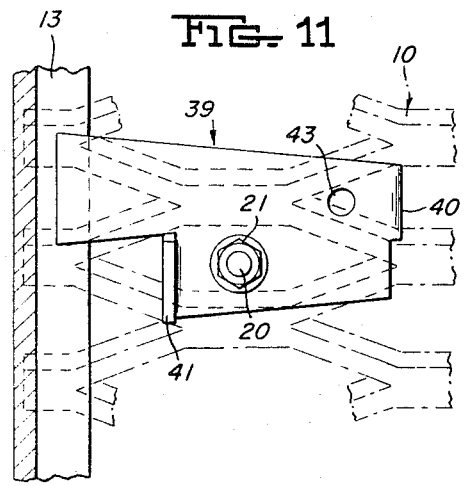
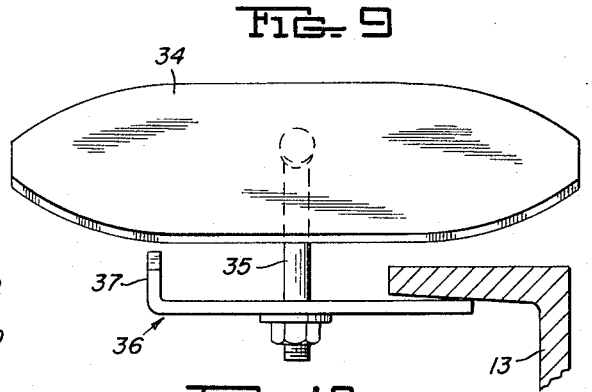
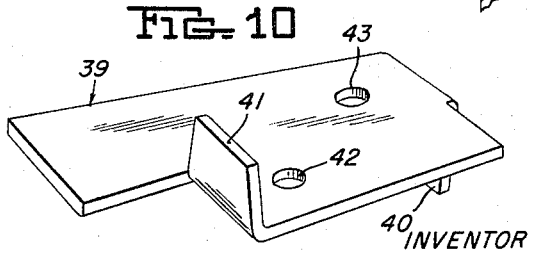
INVENTOR
JERRELL B. THOMPSON, Jr.
By Donald G. Dalton
Attorney : 3,367,078
FASTENING DEVICE FOR EXPANDED-METAL SHEETS
Jerrell B. Thompson, Jr., 1205 E. Vassar Ave., Fresno, Calif. 93704
Filed June 9, 1964, Ser. No. 373,783
8 Claims. (Cl. 52—507)

This invention relates to improved devices for fastening sheets of expanded metal to a support.

An object of the invention is to provide simplified fastening devices adapted to fix expanded metal sheets securely to a support without defacing either the sheet or the support and without welding, and which allow the sheets to be removed readily.

A further object is to provide fastening devices which afford the foregoing advantages and also avoid protuberances above the plane of the exposed surface of the sheet and the resulting safety hazard.

A further object is to provide fastening devices of the foregoing type which are of inexpensive construction and can be manufactured from stock materials.

In accomplishing these and other objects of the invention, I have provided improved details of structure, preferred forms of which are shown in the accompanying drawings, in which:

FIGURE 1 is a top plan view of an expanded metal sheet fixed to a support by use of several of my fastening devices;

FIGURE 2 is a sectional view on line II—II of FIGURE 1;

FIGURE 3 is a sectional view on a larger scale on line III—III of FIGURE 1;

FIGURE 4 is a sectional view on line IV—IV of FIGURE 3;

FIGURE 5 is a sectional view on a larger scale on line V—V of FIGURE 2;

FIGURE 6 is a perspective view of a washer and bolt I use in my fastening device;

FIGURE 7 is a perspective view of a clip I use in my fastening device;

FIGURE 8 is a sectional view similar to FIGURE 5, but showing a modification;

FIGURE 9 is a sectional view on line IX—IX of FIGURE 8, but omitting the expanded metal sheet;

FIGURE 10 is a perspective view of a further modified clip I can use in the device; and FIGURE 11 is a bottom plan view of the clip shown in FIGURE 10 installed on an expanded metal sheet.

FIGURE 1 shows in plan a conventional expanded metal sheet 10 and flanged structural members 12, 13 and 14 (for example I-beams or channels) which support the sheet. The sheet is formed of integrally connected individual strands 15 between which there are elongated diamond-shaped openings 16. The exact pattern of strands and openings may vary considerably, but the strands themselves ordinarily slope sideways from the plane of the exposed surface of the sheet, as FIGURES 3, 5 and 8 show. A plurality of fastening devices 17 constructed in accordance with my invention are used to fix the sheet to the structural members. In the form shown in FIGURES 1 to 7, each fastening device 17 includes a washer 18, a clip 19, and a conventional bolt 20 and a lock nut 21.

As FIGURES 5 and 6 best show, each washer 18 is of a configuration to fit at least partially around one of the openings 16 of sheet 10. I form the washer as a sheet metal stamping which includes a flat portion 22, an upturned flange 23, and a downward embossment 24. The flat portion 22 rests on the narrow edge of a strand 15 at one side of the opening 16. The upturned flange 23 rests on the broad face of the strand at the opposite side of the opening. The embossment 24 is shaped as a right triangle in cross section and projects inside the opening. The bottom face of the embossment is parallel with the plane of the exposed surface of sheet 10 and has a bolt hole 25. No part of the washer protrudes from the exposed surface of the sheet.

As FIGURE 7 shows, clip 19 is of trapezoidal outline. I form the clip as a sheet metal stamping, which includes a flange 26 bent perpendicularly from the narrow side of the trapezoid, a flange 27 bent perpendicularly from the intermediate portion and extending in the opposite direction from flange 26, and reinforcing ribs 28. The clip also has a pair of spaced bolt holes 29 and 30.

As FIGURES 1, 2 and 3 show, I position each clip 19 so that one end engages under a flange of the structural member 12, 13 or 14, and one of the flanges 26 or 27 of the clip abuts the underside of the expanded metal sheet 10. I place a washer 18 in the opening 16 above the clip, as already described, and adjust the clip to align one of its bolt holes 29 or 30 with the bolt hole 25 in the washer. I complete the assembly of each fastening device by inserting bolt 20 through the aligned holes and applying the lock nut 21. As FIGURE 2 shows at the left, I use the end flange 26 on clip 19 to abut sheet 10 when the opening 16 is relatively far from the structural member 12. As FIGURE 2 shows at the right (and also FIGURE 3), I invert the clip and use the intermediate flange 27 to abut the sheet when the opening 16 is closer to the structural member 13. The longer axes of the washer and clip can lie parallel to each other, as FIGURE 2 shows, or at right angles, as FIGURE 3 shows, or even at other angles, not shown.

FIGURES 8 and 9 show a modification in which the washer 34 and bolt 35 are permanently joined by welding. The washer is a flat plate which rests on the narrow edge of the strand 15 at one side of an opening 16, while the edge of the washer rests on the broad face of the strand at the opposite side. I have shown a clip 36 which has only a single flange 37 at one edge. Nevertheless for added flexibility I could use the same clip in this modification as in the form shown in FIGURES 1 to 7, or as shown in FIGURES 10 and 11 hereinafter described.

FIGURES 10 and 11 show a further modified clip 39 which includes an end flange 40 and an offset intermediate flange 41 extending in the opposite direction from the end flange. Clip 39 has two bolt holes 42 and 43 offset as shown. I can mount this clip with either flange abutting the expanded metal sheet, similar to clip 19 already described.

From the foregoing description it is seen that my invention affords a simple inexpensive fastening device readily fabricated from stock materials for securely fixing expanded metal sheets to a support. The fastening device does not deface either the sheet or the support in any way, and it can be removed readily to enable the structure to be dismantled. Also it avoids any safety hazard, since no part protrudes from the exposed surface of the sheet.

While I have shown and described only certain preferred embodiments of my invention, it is apparent that other modifications may arise. Therefore, I do not wish to be limited to the disclosure set forth but only by the scope of the appended claims.

I claim:
1. A device for fastening an expanded metal sheet to a support, said device comprising:
 a washer having an elongated flat portion tapering at its ends enabling it to fit at least partially around the edges of a diamond-shaped opening in an expanded metal sheet and to rest on the strands of the sheet at opposite sides of the opening and lie entirely inside the plane of an exposed surface thereof;

a clip having a flat portion engageable with the support and a flange spaced from its flat portion for abutting the surface of the expanded metal sheet opposite the exposed surface;

a bolt carried by said washer and extending at an oblique angle with respect to the flat portion thereof but normal to the planes of the surfaces of the expanded metal sheet and normal to the flat portion of said clip; and a lock nut threadedly engaged with said bolt.

2. A device as defined in claim 1 in which said washer has:

a flange at one edge of its flat portion; and an embossment extending from its flat portion in the opposite direction from its flange and being shaped as a right triangle in cross section to be received in an opening in the expanded metal sheet;

said bolt extending from a wall of said embossment and being normal thereto.

3. A device as defined in claim 1 in which said bolt is integrally welded to the flat portion of said washer.

4. A device as defined in claim 1 in which said clip has a second flange extending in the opposite direction from said first-named flange nad spaced differently with respect to one end of the clip, whereby either flange may abut the sheet depending on the distance between the support and the opening in the sheet.

5. The combination, with an expanded metal sheet formed of integrally connected strands and having an exposed surface and a plurality of elongated diamond-shaped openings between strands, said strands sloping from the plane of said exposed surface at each side of said openings; and a structural member supporting said sheet and engaging the surface thereof opposite said exposed surface;

of a device for fastening said sheet to said member and comprising:

a washer having an elongated flat portion tapering at its ends and fitting at least partially around the edges of one of said openings and resting on the strands at opposite sides of the opening and lying entirely inside the plane of said exposed surface;

a clip having a flat portion engaging said member opposite said sheet and a flange abutting the surface of said sheet opposite said exposed surface;

a bolt carried by said washer and extending at an oblique angle with respect to the flat portion thereof but normal to the planes of the surfaces of said sheet and through said sheet and the flat portion of said clip and normal thereto; and a lock nut threadedly engaged with said bolt.

6. A combination as defined in claim 5 in which:

said strands present a narrow edge at one side of each opening in said sheet and a broader face at the other side of the opening; and said washer includes a flange extending from one edge of its flat portion and an embossment extending from the intermediate portion of its flat portion in the opposite direction from said last-named flange;

the flat portion of said washer resting on the narrow edge of the strand;

said last-named flange resting on the broader face of the strand;

said embossment being shaped as a right triangle in cross section and extending into the opening.

7. A combination as defined in claim 5 in which said bolt is integrally welded to the flat portion of said washer.

8. A combination as defined in claim 5 in which said clip has a second flange extending in the opposite direction from said first-named flange and spaced differently with respect to one end of the clip, said second flange being adapted to abut the sheet in the event the distance between said member and the opening in the sheet is too large or too small for said first-named flange.

References Cited

UNITED STATES PATENTS

| | | | |
|---|---|---|---|
| 3,146,656 | 9/1964 | Richards | 85—9 |
| 1,033,189 | 7/1912 | Murphy | 287—189 |
| 1,069,065 | 7/1913 | Horsfield | 287—189 |
| 2,126,307 | 8/1938 | Boedeker | 52—507 |
| 2,354,506 | 7/1944 | Doke | 287—189.35 |
| 2,403,842 | 7/1946 | Bates | 52—507 |
| 2,634,833 | 4/1953 | Mac Lean et al. | 287—189.35 |
| 3,185,269 | 5/1964 | Nagin | 52—507 |
| 714,331 | 8/1954 | Simmons | 287—189.35 |
| 910,434 | 1/1909 | Thompson. | |
| 1,851,356 | 3/1932 | Greenwood | 248—228 |
| 2,639,622 | 5/1953 | Ginder | 85—9 X |

FOREIGN PATENTS 714,331  8/1954  Great Britain.

OTHER REFERENCES

Safety Grip-Strut by Products Division, the Globe Co., Chicago 9, Ill., page 5. Received in the U.S. Patent Office May 8, 1957.

DAVID J. WILLIAMOWSKY, *Primary Examiner.*

HARRISON R. MOSELEY, *Examiner.*

D. L. TAYLOR, *Assistant Examiner.*